Patented July 13, 1937

2,087,038

UNITED STATES PATENT OFFICE 2,087,038

PROCESS FOR THE DEHYDROGENATION OF HIGHER ALCOHOLS

Edward M. McMahon and John S. Kimble, Kingsport, Tenn., assignors, by mesne assignments, to Eastman Kodak Company, Jersey City, N. J., a corporation of New Jersey No Drawing. Application January 3, 1935, Serial No. 271

17 Claims. (Cl. 260—134)

This invention relates to a process for the dehydrogenation of alcohols containing more than two carbon atoms, and particularly to a process of dehydrogenating propyl alcohols.

One of the most important products resulting from the dehydrogenation of an alcohol containing more than two carbon atoms is acetone. Acetone, $(CH_3)_2CO$, is the first member of the series of ketones which contain saturated alkyl groups. In the pure state it is a colorless liquid which has a specific gravity of .792 at 20° C., and boils at 56.3° C. Acetone is important in that it is a good solvent for resins, gums and many organic compounds, such as cellulose derivatives.

Consequently, a large number of dehydrogenation methods have been developed for treating secondary alcohols, particularly in the field of acetone production. One method is to treat isopropyl alcohol in the presence of finely divided copper, manganese dioxide, iron and other metals and oxides. It has also been stated in U. S. Patent 1,892,742 that ketones may be formed from a material of the group consisting of acetic acid, acetylene, alcohol and acetaldehyde, by mixing these materials with steam and passing them over a catalyst of carbonaceous material in a reaction chamber constructed of particular metals. Furthermore these patents covering the use of activated charcoal in the preparation of acetone from acetylene, acetic acid, ethyl alcohol or acetaldehyde concern an entirely different type of reaction, thus,—

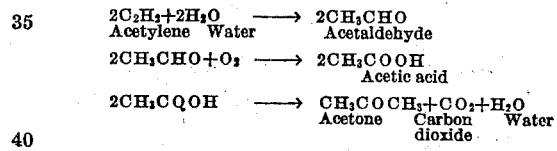

In this latter type of reaction, two molecules of the two-carbon compounds are required for each molecule of acetone produced, and carbon dioxide is formed in the reaction. A dehydrogenation reaction, as in our case with isopropanol and n-propanol, is not involved. Other references in the literature describe passing alcohols over copper-charcoal catalysts at temperatures from 200 to 300° C.

We have carefully investigated a number of processes of dehydrogenating alcohols containing more than two carbon atoms and observe that the dehydrogenation reaction is accompanied by other reactions, such as dehydration, condensation, and pyrolysis. We have determined, that to a great extent, directional influence toward any type of catalytic reaction depends upon the choice of catalysts.

For example, in the case of an iron catalyst, in the form of cast iron filings, quantities of condensation products are formed. That is, when iron is used as a catalyst for the treatment of isopropyl alcohol, the iron being in the form of iron shavings in an iron tube at temperatures of about 350° C. to 450° C., a yield of approximately 40% acetone per pass is obtained. However, relatively large quantities of mesityl oxide are formed as a by-product. Since mesityl oxide has a very high vapor pressure, it gives to even purified acetone a highly undesirable odor. Therefore, from the standpoint of formation of mesityl oxide, iron as a catalyst is undesirable.

One object of the invention is to provide a simple and inexpensive process for the dehydrogenation of alcohols containing more than two carbon atoms. Another object is to provide a process wherein the products produced are in a relatively high state of purity. A further object is to provide a process wherein the formation of dehydration products is repressed. Still another object is to provide a process that can be applied, not only to pure alcohol solutions, but to alcohol solutions containing water and certain other components. Another object is to provide a process particularly suitable for dehydrogenating propyl alcohols. Still another object is to provide a process for producing a relatively pure acetone. Other objects will hereinafter appear.

Our process, in its simplest aspects, comprises passing an alcohol containing more than two carbon atoms in contact with a charcoal catalyst maintained at a temperature sufficient to cause dehydrogenation, but at a temperature insufficient to cause substantial destruction of the dehydrogenation products that are formed.

We have found that charcoal is an excellent dehydrogenation catalyst. As far as we are aware, this material has not been investigated or described as a catalyst in the treatment of alcohols containing more than two carbon atoms and, in particular, secondary alcohols. Charcoal as a catalyst for dehydrogenation of alcohols containing more than two carbon atoms is characterized in that the dehydrogenation products formed in its presence are in a relatively high state of purity. Apparently, undesirable side reactions are reduced to a minimum. For example, we have not obtained any isolatable quantity of mesityl oxide when activated charcoal is used as a catalyst in converting iso-propyl alcohol to acetone. A catalyst, which gives an extremely small amount of mesityl oxide in the dehydrogenation of iso-propyl alcohol, is of considerable value since acetone produced by such a process employing a charcoal catalyst is of much better quality than acetone produced in many other ways.

While we prefer to use activated charcoal, heated to temperatures greater than 300° C. and up to about 700° C., it is to be understood that we do not wish to be limited to only charcoal which has been activated. Ordinary charcoal, such as that produced by wood distillation, possesses a remarkable directional influence toward dehydrogenation as is evidenced by the exceptional purity of the product, yet the extent of the dehydrogenation is less than that with activated charcoal. Hence we contemplate the use of charcoal from any of the known sources, providing as a catalyst, it yields dehydrogenation products of a relatively high degree of purity. The charcoal may be in any suitable form, such as, for example, lump, finely divided, supported on screens or in any other suitable condition. One type of charcoal which we used and obtained excellent results with was No. 10 mesh Adsorbite.

Therefore we prefer to use as a catalyst, a good grade of pure activated charcoal that contains no other constituents. Such a catalyst gives satisfactory results, yields a relatively pure product and is readily obtainable, simple and relatively inexpensive.

We appreciate, however, that many of the benefits of our invention may be obtained by employing a catalyst that consists only substantially of charcoal. That is, a combination catalyst might be prepared with other agents to an extent insufficient to cause strong side reactions. The type of combination charcoal catalyst we have been describing and which our invention embraces should not be confused with the various metal charcoal catalysts and oxide charcoal catalysts already known, such as the impregnated catalyst charcoal-copper which is active below 300° C. for dehydrogenation. For example, in respect to impregnated catalysts we have found that activated charcoal alone, as a dehydrogenation catalyst is much superior to activated charcoal impregnated with cupric oxide.

We have found that satisfactory results may be obtained by placing the charcoal in an iron tube through which the materials to be treated may be passed. In place of an iron tube, other reaction equipment constructed on either copper, brass, nickel, silver, silica, or glass, may be employed. Or chromium steels, chromium nickel steels, chromium tungsten, chromium molybdenum steels, may be used.

We have found that the presence of water and/or water vapor with the alcohol, through its mass action effect, tends to reduce the quantity of compounds, such as propylene, which may be formed. Hence we prefer to have some water vaporized over with the alcohol as it is passed through the reaction apparatus.

While the reaction may be carried out at atmospheric pressure, we find it desirable in order to have a defined movement of the vapors through the system to operate under a slight pressure, say approximately two inches of water. Of course, higher pressures could be used and thereby speed up the movement of the vapors and reaction products. Any air or oxygen that may initially be in the system is quickly displaced by the alcohol and other products as they pass through the system. We find that alcohol-water mixtures give satisfactory results, but it is to be understood that this invention contemplates the dilution of the reaction materials with other constituents, such as nitrogen, or carbon dioxide, provided the diluent does not cause contamination of the final product being produced.

Any suitable apparatus may be employed for carrying out our rehydrogenation process. One form of apparatus would comprise a vaporizer for the alcohol. The vaporizer may be connected to a preheater and the preheater to the reaction tube containing the charcoal catalyst. Means, such as condensers and ice packed towers, for collecting the dehydrogenation products would, of course, be joined to the end of the reaction tube. When employing large amounts of water, the use of a preheater may be advisable, otherwise, it may be dispensed with especially when the reaction tube is quite long.

Our process is particularly suited to the dehydrogenation of iso-propyl alcohol and large yields of acetone in a relatively high state of purity may be produced by practicing the principles of this invention. Iso-propyl alcohol, or 2-propyl alcohol, has the formula $CH_3.CHOH.CH_3$. In the pure state, it is a colorless liquid having a density of .78 and a boiling point of 82° C. We generally employ a mixture of water and iso-propyl alcohol. An azeotropic quantity of water may be incorporated with the iso-propyl alcohol by straight distillation of a water-iso-propyl alcohol mixture. This azeotropic binary-mixture boils at 79° C. Hence, by straight distillation of a water-iso-propyl alcohol mixture at this temperature, it is possible to cause a binary mixture to be given off, which comprises about 88% of iso-propyl alcohol and 12% of water. This binary mixture is passed through the reaction apparatus containing the charcoal catalyst at temperatures preferably from 500–700° C. and is thereby largely converted to an acetone of a high purity.

There are a number of advantages in vaporizing the alcohol-water as described. Since iso-propyl alcohol forms a minimium boiling mixture with water, the composition of the vapor entering the reaction chamber is substantially a constant namely, about 88% of iso-propyl alcohol and 12% water in the instance just described. Other higher alcohol-water mixtures will yield different vapors but of a constant composition if they form minimum boiling points with water. By vaporization any non-volatile solid impurities present in the water-alcohol solution are retained in the vaporizer and are not caused to go into the catalyst chamber. The presence of water, by its mass action effect, tends to reduce the formation of compounds such as propylene.

While we have described 12% of water, this is merely the preferred amount, other runs have made with both larger and smaller amounts of water than 12%. The large amounts decreased to some extent the quantity of acetone converted per pass. This was no doubt due to the fact that we were using a part of our reaction tube as a preheater. Hence the larger quantity of water would tend to cool the apparatus more rapidly than would be the case with 12% of water. By means of a preheater or other expedient, the quantity of acetone produced can be kept to standard even when using larger amounts of water. It is also possible to introduce the water by vaporizing it from one source, the alcohol from another source and causing the two to mix.

While we have described the results based on a single pass, it is possible to recirculate the unreacted materials and get a higher yield. Also we contemplate employing reaction tubes in series in order that the unreacted materials may be further treated.

The reaction gases containing acetone and hydrogen are cooled in condensers to below atmospheric temperatures or they may be scrubbed by passage through an ice-packed tower so as to remove substantially all of the acetone. The hydrogen may be used as a raw material for the production of other chemical products or as a reducing agent.

The acetone produced may be placed directly in containers or it may be passed to other apparatus or processes for utilization, such as to a pyrolysis treatment to produce ketene.

Our process is also particularly suitable for treating n-propyl alcohol, propanol, or 1-propyl alcohol, as it is sometimes described. This compound has the formula—$CH_3CH_2CH_2OH$. In the pure state, it is a colorless liquid with a boiling point of 97° C. When thermocatalytically treated in the presence of charcoal, good yields of propionic aldehyde, or propanal as it may be called, is obtained. This aldehyde is of a high degree of purity.

One illustrative specific example of our process is as follows: 64 grams of iso-propanol are passed in vapor form in admixture with its azeotropic quantity of water, into an iron tube containing activated charcoal at a temperature of 550° C. On a single pass, 71% acetone of high purity was formed.

Another run similar to that just described was made, but a temperature of around 600° C. was employed. We found that at about 600° C. activated charcoal gives better conversion. We give below data on two additional representative runs in which the iso-propyl alcohol was fed as an azeotropic mixture with water.

| Run No. | 1 | 2 |
| --- | --- | --- |
| Gm. iso-propanol fed (as 100%) | 707 | 702 |
| Gm. iso-propanol recovered (as 100%) | 4 | 26 |
| Gm. iso-propanol reacted (as 100%) | 703 | 676 |
| Vapor velocity in cm. per sec. | 24 | 23.8 |
| Furnace temperature ° C. | 600 | 600 |
| Gm. acetone isolated | 636 | 593 |
| Liters gas evolved at 0° and 760 mm | 262 | 270 |
| % Yield based on iso-propanol fed and acetone isolated | 93 | 88 |
| % Yield based on iso-propanol reacted and acetone isolated | 94 | 91 |
| % Yield calculated from gas analysis | 98 | 97 |
| *Gas analysis on airfree basis* | | |
| $CO_2$ | 0.00 | 0.11 |
| Olefins | 2.87 | 3.74 |
| $H_2$ | 92.19 | 91.51 |
| CO | 0.85 | 0.62 |
| Residue | 4.09 | 4.02 |

The acetone in all instances was of a very high grade hence suitable for use in treating cellulose derivatives and other materials requiring a high quality product.

These examples have been described merely for the purposes of illustration and are not to be construed as limiting to the invention thereto. While our process is particularly suited for treating iso-propyl alcohol and gives excellent results when so employed, our process may be applied to the treatment of various other higher alcohols with the production of useful products. Our invention embraces the dehydrogenation of higher alcohols such as butyl and amyl. An azeotropic quantity of water would generally be employed with the higher alcohols, although this would not be absolutely necessary. The temperatures and vapor velocities used would be approximately the same as for the propyl alcohols. Examples of the primary and secondary butyl and amyl alcohols to which our invention may be applied are as follows:

| Alcohol | Dehydrogenation Product |
| --- | --- |
| Normal butanol | Normal butyraldehyde. |
| Secondary butanol | Methyl ethyl ketone. |
| Isobutanol | Isobutyraldehyde. |
| Normal amyl alcohol or normal butyl carbinol. | N-valeraldehyde (pentanal). |
| Isobutyl carbinol | Isovaleraldehyde (methyl-3-butanal). |
| Methyl n-propyl carbinol | Methyl n-propyl ketone. |
| Methyl iso-propyl carbinol | Methyl iso-propyl ketone. |
| Diethyl carbinol | Diethyl ketone. |
| Active amyl alcohol | Methyl-2-butanal. |
| Dimethyl-2 2-butanol-1 | Dimethyl-2.2-butanal. |

From the foregoing, it will be apparent that our invention may be carried out in many forms of apparatus. It will also be understood that while the process is preferably operated under pressure, it can be conducted at normal atmospheric pressure or sub-atmospheric pressure.

What we claim as our invention and desire to secure by Letters Patent of the United States is:

1. A process for the production of relatively pure dehydrogenation products of alcohols containing more than two carbon atoms, which comprises bringing an alcohol containing more than two carbon atoms in contact with a cataylst consisting of activated charcoal maintained at a temperature between 400° C.-700° C. to cause dehydrogenation.

2. A process for the production of dehydrogenation products free of substantial amounts of dehydration products from alcohols containing more than two carbon atoms, which comprises passing an alcohol containing more than two carbon atoms into a reaction chamber maintained at a temperature between 400° C. and about 700° C. in the presence of a catalyst essentially comprising activated charcoal.

3. A process for the production of substantially pure dehydrogenation products from alcohols containing more than two carbon atoms, which comprises passing a mixture of an alcohol containing more than two carbon atoms with water vapor over a catalyst comprised principally of charcoal maintained at a temperature between 300° C. and about 700° C.

4. A process for the production of ketones and aldehydes by dehydrogenation, which comprises passing at a pressure above atmospheric alcohols containing more than two carbon atoms admixed with water over activated charcoal maintained at a temperature between 300° C. and about 700° C.

5. A process for the production of a relatively pure acetone free of substantial amounts of propylene and mesityl oxide, which comprises passing iso-propyl alcohol in contact with charcoal maintained at a temperature between 400° C. and about 700° C.

6. A process for the production of relatively pure acetone by dehydrogenation, which comprises reacting an iso-propyl alcohol-water vapor mixture in the presence of a catalyst consisting substantially of charcoal maintained at a temperature between 300° C. and about 700° C.

7. A process for the production of relatively pure acetone by dehydrogenation, which comprises contacting with an activated charcoal catalyst maintained at a temperature of about 500° C. to 600° C., at a pressure slightly above atmospheric, a mixture of iso-propyl alcohol with its azeotropic quantity of water vapor.

8. A process for the production of propionic aldehyde by dehydrogenation, which comprises passing n-propyl alcohol in contact with an activated charcoal catalyst maintained at a temperature between 400° C. and about 700° C.

9. In the process of thermo-catalytically dehydrogenating secondary alcohols in the presence of a charcoal catalyst, the step which comprises displacing the air initially in the system by means of alcohol and reaction gases.

10. A process for the production of a relatively pure acetone by dehydrogenation, which comprises contacting iso-propyl alcohol with a substantially pure activated charcoal maintained at a temperature between about 400° C. and about 700° C.

11. In a process for the production of a relatively pure acetone by contacting iso-propyl alcohol with activated charcoal maintained at a temperature between 300° C. and about 700° C., the step which comprises causing the reaction materials to be passed in contact with the charcoal at a pressure in excess of atmospheric.

12. A process for the production of relatively pure acetone by dehydrogenation, which comprises passing an iso-propyl alcohol-water vapor mixture in contact with activated charcoal maintained at a temperature between about 400° C. and 700° C.

13. A process for the production of acetone which comprises reacting iso-propyl alcohol in the presence of catalyst comprising principally charcoal maintained at a temperature between about 400° C. and about 700° C., and withdrawing and cooling reaction gases containing acetone and substantial quantities of hydrogen.

14. A process for the production of relatively pure propionic aldehyde by dehydrogenation, which comprises passing n-propyl alcohol in contact with an activated charcoal maintained at a temperature between about 450° C. and about 700° C.

15. A process for the production of relatively pure propanal which comprises contacting at a pressure slightly above atmospheric, a mixture of propanol and water vapor with an activated charcoal catalyst maintained at a temperature of about 500° C. to about 650° C.

16. A process for the manufacture of a relatively pure acetone from iso-propyl alcohol by dehydrogenation, which comprises mixing the vapors of the alcohol with water vapor and passing the mixture into a reaction chamber maintained at a temperature between 500° C. and about 700° C. in the presence of a charcoal catalyst, the walls of the reaction apparatus being constructed of iron.

17. A process for the production of a relatively pure acetone which comprises passing iso-propyl alcohol in contact with charcoal maintained at a temperature of about 525° C. and about 700° C., the charcoal being housed in a reaction chamber constructed at least in part of a steel containing chromium.

EDWARD M. McMAHON.
JOHN S. KIMBLE.